US009845394B2

(12) United States Patent
Matsukawa et al.

(10) Patent No.: US 9,845,394 B2
(45) Date of Patent: Dec. 19, 2017

(54) METHOD FOR PRODUCING THIN FILM HAVING HIGH REFRACTIVE INDEX AND HIGH TRANSPARENCY, AND THIN FILM PRODUCED BY THE METHOD

(71) Applicants: OSAKA MUNICIPAL TECHNICAL RESEARCH INSTITUTE, Osaka (JP); DAIHACHI CHEMICAL INDUSTRY CO., LTD., Osaka (JP)

(72) Inventors: Kimihiro Matsukawa, Osaka (JP); Seiji Watase, Osaka (JP); Koji Mitamura, Osaka (JP); Manabu Hirata, Osaka (JP)

(73) Assignees: OSAKA MUNICIPAL TECHNICAL RESEARCH INSTITUTE, Osaka (JP); DAIHACHI CHEMICAL INDUSTRY CO., LTD., Osaka (JP)

( * ) Notice: Subject to any disclaimer, the term of this patent is extended or adjusted under 35 U.S.C. 154(b) by 0 days.

(21) Appl. No.: 14/914,684

(22) PCT Filed: Aug. 20, 2014

(86) PCT No.: PCT/JP2014/071712
§ 371 (c)(1),
(2) Date: Feb. 26, 2016

(87) PCT Pub. No.: WO2015/029844
PCT Pub. Date: Mar. 5, 2015

(65) Prior Publication Data
US 2016/0200913 A1 Jul. 14, 2016

(30) Foreign Application Priority Data
Aug. 27, 2013 (JP) .................. 2013-176163

(51) Int. Cl.
*C07F 7/00* (2006.01)
*C09D 4/00* (2006.01)
*B05D 3/02* (2006.01)
*B05D 3/06* (2006.01)
*B05D 7/02* (2006.01)
*C03C 17/25* (2006.01)
*C08F 230/02* (2006.01)
*C09D 5/00* (2006.01)
*G02B 1/00* (2006.01)

(52) U.S. Cl.
CPC ............. *C09D 4/00* (2013.01); *B05D 3/0254* (2013.01); *B05D 3/067* (2013.01); *B05D 7/02* (2013.01); *C03C 17/25* (2013.01); *C08F 230/02* (2013.01); *C09D 5/00* (2013.01); *C03C 2217/228* (2013.01); *C03C 2217/29* (2013.01); *C03C 2217/70* (2013.01); *C03C 2218/116* (2013.01); *C03C 2218/32* (2013.01); *G02B 1/00* (2013.01)

(58) Field of Classification Search
CPC ...... B05D 3/0254; B05D 3/067; B05D 5/702; C03C 17/25; C08F 230/02; C09D 5/00
USPC ........................................ 556/100
See application file for complete search history.

(56) References Cited

U.S. PATENT DOCUMENTS

| 2002/0018886 A1* | 2/2002 | Matsufuji ............... C09D 4/00 428/328 |
|---|---|---|
| 2003/0040551 A1 | 2/2003 | Yamaguchi et al. |
| 2004/0171743 A1 | 9/2004 | Flaim et al. |
| 2006/0030648 A1 | 2/2006 | Flaim et al. |
| 2009/0274842 A1 | 11/2009 | Sawada et al. |
| 2015/0051344 A1 | 2/2015 | Matsukawa et al. |

FOREIGN PATENT DOCUMENTS

| JP | 2001-89535 | 4/2001 |
|---|---|---|
| JP | 2001-310423 | 11/2001 |
| JP | 2007-521355 | 8/2007 |

(Continued)

OTHER PUBLICATIONS

English translation of the International Preliminary Report on Patentability dated Mar. 10, 2016 in corresponding International Application No. PCT/JP2014/071712.
International Search Report (ISR) dated Nov. 25, 2014 in International (PCT) Application No. PCT/JP2014/071712.
Extended European Search Report dated Jan. 5, 2017 in corresponding European Application No. 14840399.1.

*Primary Examiner* — Rosalynd Keys
*Assistant Examiner* — Kofi Adzamli
(74) *Attorney, Agent, or Firm* — Wenderoth, Lind & Ponack, L.L.P.

(57) ABSTRACT

Provided are a method for easily and quickly producing a patterned thin film having a high refractive index and a high transparency, and a highly refractive thin film produced by the method. The method comprises a first step: a step of forming, on a substrate, a coating using a sol containing a metal oxide modified with a phosphorus compound represented by the following formula (1):

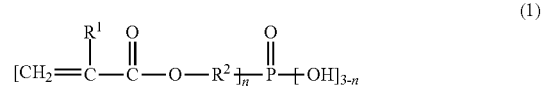

(1)

(wherein $R^1$ is a hydrogen atom, an alkyl group, an alkynyl group, an alkenyl group, an aryl group, an aliphatic heterocyclic group, or an aromatic heterocyclic group; $R^2$ is a divalent organic residue; and n is 1 or 2); a second step: a step of curing the coating on the substrate obtained in the first step by light irradiation; and a third step: a step of further adding energy to the cured film obtained in the second step by heating and/or light irradiation.

6 Claims, No Drawings

(56) References Cited

FOREIGN PATENT DOCUMENTS

| JP | 2008-308593 | 12/2008 |
| JP | 2010-181801 | 8/2010 |
| JP | 2012-25882 | 2/2012 |
| WO | 2007/091730 | 8/2007 |
| WO | 2013/161859 | 10/2013 |

\* cited by examiner

METHOD FOR PRODUCING THIN FILM HAVING HIGH REFRACTIVE INDEX AND HIGH TRANSPARENCY, AND THIN FILM PRODUCED BY THE METHOD

TECHNICAL FIELD

The present invention relates to a method for producing a thin film having a high refractive index and a high transparency. In particular, the present invention relates to a method for producing a thin film having a high refractive index and a high transparency, which method enables quick and easy patterning of a film and easy adjustment of the refractive index thereof.

BACKGROUND ART

It is known that the properties of semiconductor devices, such as a touchscreen display, a photo sensor, an integrated optical (photonic) circuit, a light emitting diode (LED), etc. are improved by applying a transparent thin film having a high refractive index to the light-emitting part, the light-sensitive part, or the like of the device structure. Known materials for such a transparent thin film having a high refractive index include organic polymers, organic-inorganic hybrid polymers, inorganic metal oxides, etc.

Organic polymers can easily be formed into a thin film at a low temperature, and provide excellent mechanical properties including high surface adhesiveness. The refractive indices of organic polymers in the visible wavelength range are as high as about 1.65 to 1.70, but this level is close to the upper limit. In addition, these high-refractive-index polymers have limited thermal and chemical stabilities because they generally contain a high concentration of highly-polar atoms, such as bromine, iodine, or sulfur atoms.

An organic-inorganic hybrid polymer is obtainable by dispersing nano-sized (1 to 50 nm in diameter) metal oxide particles in a carrier polymer, and has an increased refractive index without the loss of original transparency of the polymer. However, it is difficult to achieve a refractive index comparable to that of the dispersed metal oxide alone, and the refractive index of an organic-inorganic hybrid polymer in the visible wavelength range is about 1.70 to 1.80, which is close to the upper limit.

Among transparent metal oxides having high refractive indices, titanium oxide and zirconium oxide are best known. When used as thin films, these metal oxides exhibit particularly high optical transparency, and the refractive indices thereof are 2.0 or more in the visible wavelength range. However, in order to form thin films of these metal oxides, deposition by an expensive and inefficient method, such as vaporization or sputtering, is required in general. Furthermore, a deposited metal oxide film is brittle and does not tend to firmly adhere to the device surface.

JP 2007-521355 T discloses a method for producing a thin film of a metal oxide by applying, onto a substrate, an organic polymer solution in which an organometallic oligomer composing a chelate complex is dispersed, heating the coating for the curing thereof, and further heating the cured film for the decomposition of organic matter. However, this method is not suitable for mass production for the reason that the thermal curing of the coating hampers quick and accurate patterning.

CITATION LIST

Patent Literature

Patent Literature 1: JP 2007-521355 T

SUMMARY OF INVENTION

Technical Problem

Therefore, an objective of the present invention is to provide a method for easily and quickly producing a patterned thin film having a high refractive index and a high transparency, and a highly refractive thin film produced by the method.

Solution to Problem

The present inventors conducted extensive research to achieve the above-mentioned objective and as a result found that a coating formed from a sol containing a metal oxide modified with an organic phosphorus compound having a specific structure (hereinafter referred to as phosphorus-modified metal oxide sol) is UV curable and quick and accurate patterning can be achieved in such a thin film having a high metal oxide content. In addition, the inventors found that a higher refractive index (1.8 or higher) is imparted to the patterned thin film by the addition of thermal or optical energy. Based on the above findings, the inventors conducted further research and completed the present invention.

That is, the present invention is specified as follows.

[1] A method for producing a thin film, the method comprising a first step: a step of forming, on a substrate, a coating using a sol containing a metal oxide modified with a phosphorus compound represented by the following formula (1):

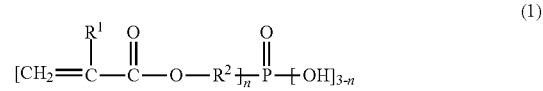

(wherein $R^1$ is a hydrogen atom, an alkyl group, an alkynyl group, an alkenyl group, an aryl group, an aliphatic heterocyclic group, or an aromatic heterocyclic group; R is a divalent organic residue; and n is 1 or 2), a second step: a step of curing the coating on the substrate obtained in the first step by light irradiation, and a third step: a step of further adding energy to the cured film obtained in the second step by heating and/or light irradiation.

[2] The method according to the above [1], wherein $R^1$ in the formula (1) is a hydrogen atom or a linear or branched alkyl group having 1 to 5 carbon atoms.

[3] The method according to the above [1] or [2], wherein $R^2$ in the formula (1) is a divalent organic residue represented by the following formula (2):

(wherein Y is a linear or branched alkylene group having 1 to 10 carbon atoms; and p is an integer of 1 to 10).

[4] The method according to the above [3], wherein Y in the formula (2) is a linear or branched alkylene group having 1 to 4 carbon atoms.

[5] The method according to any one of the above [1] to [4], wherein the metal of the metal oxide is at least one selected from titanium, zirconium, hafnium, aluminum, zinc, and tin.
[6] The method according to any one of the above [1] to [5], wherein the metal of the metal oxide is at least one selected from titanium and zirconium.
[7] The method according to any one of the above [1] to [6], wherein the light used in the second step is a light comprising a wavelength of 150 to 400 nm.
[8] The method according to any one of the above [1] to [7], wherein the heating temperature in the third step is 50 to 800° C.
[9] The method according to any one of the above [1] to [8], wherein the wavelength of the light used in the third step is 150 to 1000 nm and the accumulated amount of light irradiation is 100 to 2000 mJ/cm².
[10] A thin film produced by the method according to any one of the above [1] to [9].
[11] The thin film according to the above [10] of which the refractive index is 1.7 or higher.

Advantageous Effects of Invention

According to the production method of the present invention, an accurately patterned thin film having a high refractive index and a high transparency can easily be produced, and the refractive index can easily be adjusted to a desired value.

DESCRIPTION OF EMBODIMENTS

Phosphorus-Modified Metal Oxide Sol

The phosphorus-modified metal oxide sol of the present invention comprises a phosphorus compound represented by the following formula (1):

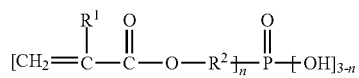
(1)

(wherein $R^1$ is a hydrogen atom, an alkyl group, an alkynyl group, an alkenyl group, an aryl group, an aliphatic heterocyclic group, or an aromatic heterocyclic group; R is a divalent organic residue; and n is 1 or 2) and a metal oxide.
<Materials for Phosphorus-Modified Metal Oxide Sol>
Phosphorus Compound The phosphorus compound used in the present invention is represented by the following formula (1).

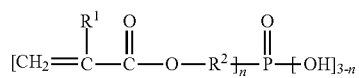
(1)

(In the formula, $R^1$ is a hydrogen atom, an alkyl group, an alkynyl group, an alkenyl group, an aryl group, an aliphatic heterocyclic group, or an aromatic heterocyclic group; $R^2$ is a divalent organic residue; and n is 1 or 2.)

The alkyl group represented by $R^1$ may be linear or branched, and examples thereof include linear or branched alkyl groups having 1 to 20 carbon atoms. Examples of the alkyl group include methyl, ethyl, n-propyl, isopropyl, n-butyl, sec-butyl, isobutyl, tert-butyl, n-pentyl, neopentyl, tert-pentyl, isopentyl, 2-methylbutyl, 1-ethylpropyl, hexyl, isohexyl, 4-methylpentyl, 3-methylpentyl, 2-methylpentyl, 1-methylpentyl, 3,3-dimethylbutyl, 2,2-dimethylbutyl, 1,1-dimethylbutyl, 1,2-dimethylbutyl, 1,3-dimethylbutyl, 2,3-dimethylbutyl, 1-ethylbutyl, 2-ethylbutyl, heptyl, octyl, nonyl, decyl, cetyl, and stearyl. The number of carbon atoms in the above-mentioned alkyl group is preferably 1 to 12, and more preferably 1 to 5.

The alkynyl group represented by $R^1$ may be linear or branched, and examples thereof include alkynyl groups having 2 to 15 carbon atoms. Examples of the alkynyl group include ethynyl, 1-propynyl, 2-propynyl, 1-butynyl, 3-butynyl, pentynyl, and hexynyl. The number of carbon atoms in the alkynyl group is preferably 2 to 10, and more preferably 2 to 6.

The alkenyl group represented by $R^1$ may be linear or branched, and examples thereof include alkenyl groups having 2 to 15 carbon atoms. Examples of the alkenyl group include vinyl, 1-propenyl, allyl, 1-butenyl, 2-butenyl, 3-butenyl, pentenyl, hexenyl, isopropenyl, 2-methyl-2-propenyl, 1-methyl-2-propenyl, and 2-methyl-1-propenyl. The number of carbon atoms in the alkynyl group is preferably 2 to 10, and more preferably 2 to 6.

The aryl group represented by $R^1$ is, for example, an aryl group having 6 to 20 carbon atoms. Examples of the aryl group include phenyl, 1-naphthyl, 2-naphthyl, anthryl, phenanthryl, 2-biphenyl, 3-biphenyl, 4-biphenyl, and terphenyl.

The aliphatic heterocyclic group represented by $R^1$ may be, for example, 5- to 8-membered and preferably 5- or 6-membered mono-cyclic, polycyclic, or condensed ring aliphatic heterocyclic group having 2 to 14 carbon atoms and at least one, preferably 1 to 3 hetero atoms, such as nitrogen, oxygen, and/or sulfur atoms. Examples of the aliphatic heterocyclic group include pyrrolidyl-2-one, piperidino, piperadinyl, morpholino, tetrahydrofuryl, tetrahydropyranyl, and tetrahydrothienyl.

The aromatic heterocyclic group represented by $R^1$ may be, for example, 5- to 8-membered and preferably 5- or 6-membered mono-cyclic, polycyclic, or condensed ring heteroaryl group having 2 to 15 carbon atoms and at least one, preferably 1 to 3 hetero atoms, such as nitrogen, oxygen, and/or sulfur atoms. Examples of the aromatic heterocyclic group include furyl, thienyl, pyrrolyl, pyridyl, pyrimidinyl, pyradyl, pyridadyl, pyrazolyl, imidazolyl, oxazolyl, thiazolyl, benzofuryl, benzothienyl, quinolyl, isoquinolyl, quinoxalyl, phthalazyl, quinazolyl, naphthylidyl, cinnolyl, benzoimidazolyl, benzoxazolyl, and benzothiazolyl.

Any hydrogen atom of the alkyl group, the alkynyl group, the alkenyl group, the aryl group, the aliphatic heterocyclic group, or the aromatic heterocyclic group may be replaced with a substituent. The substituent is not particularly limited, and examples thereof include an alkyl group, an alkynyl group, an alkenyl group, an aryl group, an aralkyl group, an alkoxy group, an alkylenedioxy group, an aryloxy group, an aralkyloxy group, a heteroaryloxy group, an alkylthio group, a cycloalkyl group, an aliphatic heterocyclic group, an aromatic heterocyclic group, an arylthio group, an aralkylthio group, a heteroarylthio group, an amino group, a substituted amino group, a cyano group, a hydroxyl group, an oxo group, a nitro group, a mercapto group, and a halogen atom. The number of the substituents is preferably 1 to 3, and more preferably 1 or 2.

$R^1$ is preferably a hydrogen atom or a linear or branched alkyl group having 1 to 5 carbon atoms, more preferably a hydrogen atom or a linear alkyl group having 1 to 3 carbon atoms, and particularly preferably a hydrogen atom, a methyl group, or an ethyl group.

The organic residue of $R^2$ is not particularly limited as long as it is a partial structure of a functional group introduced into the phosphorus compound. Examples of the organic residue include an alkylene group, a cycloalkylene group, an alkynylene group, an alkenylene group, an arylene group, a heteroarylene group, an aralkylene group, an oxyalkylene group, a cycloalkyleneoxy group, an aryleneoxy group, an aralkyleneoxy group, a heteroaryleneoxy group, an alkylenethio group, an arylenethio group, an aralkylenethio group, and a heteroarylenethio group. Specific examples of the groups are conveniently selected from known ones. The number of carbon atoms is not particularly limited, and may be, for example, about 1 to 10.

The organic residue of R is preferably the group represented by the following formula (2).

    (2)

(In the formula (2), Y is a linear or branched alkylene group having 1 to 10 carbon atoms; and p is an integer of 1 to 10.)

In the formula (2), Y is a linear or branched alkylene group having 1 to 10 carbon atoms, and examples thereof include methylene, ethylene, methylethylene, ethylethylene, n-propylene, 1-methylpropylene, 2-methylpropylene, n-butylene, n-hexylene, n-heptylene, and n-octylene. Y is preferably a linear alkylene group having 1 to 4 carbon atoms, and particularly preferably methylethylene or ethylene.

p is preferably an integer of 1 to 10, more preferably an integer of 1 to 5, and particularly preferably an integer of 1 to 3.

The phosphorus compound represented by the formula (1) is not particularly limited, and for example,
2-acryloyloxyethylacidphosphate,
3-acryloyloxypropylacidphosphate,
2-acryloyloxypropylacidphosphate,
6-acryloyloxyhexylacidphosphate,
10-acryloyloxydecylacidphosphate,
2-methacryloyloxyethylacidphosphate,
3-methacryloyloxypropylacidphosphate,
2-methacryloyloxypropylacidphosphate,
6-methacryloyloxyhexylacidphosphate, or
10-methacryloyloxydecylacidphosphate can be used.

The phosphorus compound used in the present invention may be a commercial product or a compound produced by a known process. Examples of the commercial phosphorus compound include MR-200 made by Daihachi Chemical Industry Co., Ltd. or the like.

Metal Oxide

The metal oxide of the present invention is a compound mainly composed of a metal atom and an oxygen atom. The metal oxide can be used as it is, i.e. in the form of fine particles, or in the form of a metal oxide sol produced by a known method. For example, a metal oxide sol can be produced by a method in which a metal alkoxide or a metal halide is hydrolyzed in a solvent and then condensed. The solvent used for the above reaction may be an inorganic solvent, an organic solvent, or a mixture thereof, and examples of the mixture include a mixture of toluene, isopropyl alcohol, and water.

Examples of the metal in the metal oxide include titanium, zirconium, hafnium, aluminum, zinc, and tin. Among them, preferred are titanium and zirconium because of their high refractive index, and particularly preferred is titanium.

Examples of the metal alkoxide include a titanium alkoxide, a zirconium alkoxide, a hafnium alkoxide, an aluminum alkoxide, a zinc alkoxide, and a tin alkoxide.

Examples of the titanium alkoxide include titanium dialkoxides, such as titanium dialkyldialkoxides (for example, titanium dimethyldimethoxide, titanium diethyldiethoxide, etc.); titanium trialkoxides, such as titanium trialkoxides (for example, titanium trimethoxide, titanium triethoxide, etc.), titanium alkyltrialkoxides, (for example, titanium ethyltrimethoxide, etc.), and titanium aryltrialkoxides (for example, titanium phenyltrimethoxide, etc.); titanium tetraalkoxides (for example, titanium tetraalkoxides having 1 to 18 carbon atoms, such as titanium tetramethoxide, titanium tetraethoxide, titanium tetrapropoxide, titanium tetraisopropoxide, titanium tetraisobutoxide, titanium tetra-n-butoxide, titanium tetra-t-butoxide, titanium tetranonyloxide, titanium tetrakis(2-ethylhexyloxide), titanium tetrakis(methoxypropoxide), titanium tetrastearyloxide, and titanium tetraisostearyloxide, preferably titanium tetraalkoxides having 1 to 10 carbon atoms, more preferably titanium tetraalkoxides having 1 to 6 carbon atoms); etc.

Examples of the zirconium alkoxide include zirconium tetraalkoxides (for example, zirconium tetraalkoxides having 1 to 18 carbon atoms, such as zirconium tetramethoxide, zirconium tetraethoxide, zirconium tetraisopropoxide, zirconium tetraisobutoxide, zirconium tetra-n-butoxide, zirconium tetra-t-butoxide, zirconium tetrakis(2-ethylhexyloxide), and zirconium tetrakis(2-methyl-2-butoxide), preferably zirconium tetraalkoxides having 1 to 10 carbon atoms, more preferably zirconium tetraaikoxides having 1 to 6 carbon atoms), etc.

Examples of the hafnium alkoxide include hafnium tetramethoxide, hafnium tetraethoxide, hafnium tetraisopropoxide, and hafnium tetra-t-butoxide.

Examples of the aluminum alkoxide include aluminum trialkoxides (for example, aluminum trimethoxide, aluminum triethoxide, aluminum tripropoxide, aluminum tri-n-butoxide, aluminum tri-s-butoxide, aluminum tri-t-butoxide, etc.).

Examples of the zinc alkoxide include zinc diethoxide, zinc bismethoxyethoxide, etc.

Examples of the tin alkoxide include tin tetraethoxide, tin tetraisopropoxide, tin tetra-n-butoxide, etc.

Among such metal alkoxides, preferred are titanium alkoxides and zirconium alkoxides, more preferred are titanium tetraethoxide, titanium tetra-n-propoxide, titanium tetraisopropoxide, titanium tetra-n-butoxide, titanium tetraisobutoxide, titanium tetra-s-butoxide, titanium tetra-t-butoxide, zirconium tetraethoxide, zirconium tetra-n-propoxide, zirconium tetraisopropoxide, zirconium tetra-n-butoxide, zirconium tetraisobutoxide, zirconium tetra-s-butoxide, and zirconium tetra-t-butoxide, and particularly preferred are titanium tetra-n-butoxide, titanium tetraisobutoxide, titanium tetra-s-butoxide, and titanium tetra-t-butoxide.

Examples of the metal halide include titanium halides, such as titanium tetrachloride and titanium tetrabromide; zirconium halides, such as zirconium tetrachloride, zirconium tetrabromide, and zirconium iodide; zirconium oxyhalides, such as zirconium oxychloride and zirconium oxyiodide; hafnium halides, such as hafnium tetrachloride; hafnium oxyhalides, such as hafnium oxychloride; aluminum halides, such as aluminum bromide, aluminum chloride, and aluminum iodide; zinc halides, such as zinc chloride, zinc bromide, and zinc iodide; and tin halides, such as tin chloride, tin bromide, and tin iodide; etc.

Among them, preferred are titanium tetrachloride, titanium tetrabromide, zirconium tetrachloride, zirconium tetrabromide, and zirconium oxychloride, and particularly preferred are titanium tetrachloride, zirconium tetrachloride, and zirconium oxychloride.

These metal alkoxides and metal halides may be used alone or in combination of two or more thereof.

Solvent

The phosphorus-modified metal oxide sol of the present invention comprises a solvent.

Examples of usable organic solvents include alcohols (for example, alkyl alcohols, such as ethanol, propanol, and isopropanol, glycols, such as ethylene glycol and propylene glycol, etc.), hydrocarbons (for example, aliphatic hydrocarbons, such as hexane, alicyclic hydrocarbons, such as cyclohexane, aromatic hydrocarbons, such as toluene and xylene, etc.), halogenated hydrocarbon (for example, methylene chloride, chloroform, etc.), ethers (for example, chain ethers, such as dimethyl ether and diethyl ether, cyclic ethers, such as dioxane and tetrahydrofuran, etc.), esters (for example, methyl acetate, ethyl acetate, butyl acetate, ethyl lactate, ethyl butylate, etc.), ketones (for example, acetone, ethylmethyl ketone, methylisobutyl ketone, cyclohexanone, N-methyl-2-pyrrolidone, etc.), cellosolves (for example, methyl cellosolve, ethyl cellosolve, butyl cellosolve, etc.), carbitols (for example, methyl carbitol, ethyl carbitol, butyl carbitol, etc.), propylene glycol monoalkylethers (for example, propylene glycol monomethylether, propylene glycol monoethylether, propylene glycol mono-n-butylether, etc.), glycol ether esters (for example, ethylene glycol monomethylether acetate, propylene glycol monomethylether acetate, etc.), amides (for example, N,N-dimethyl formamide, N,N-dimethyl acetamide, etc.), sulfoxides (for example, dimethyl sulfoxide etc.), nitriles (for example, acetonitrile, benzonitrile, etc.), N-methyl pyrrolidone, etc. Among them, preferred are aromatic hydrocarbons and glycol ether esters, and particularly preferred are toluene and propylene glycol monomethylether acetate.

Examples of the inorganic solvent include acidic aqueous solutions containing acidic substances, such as hydrogen chloride, sulfuric acid, nitric acid, carbonic acid, and phosphoric acid; basic aqueous solutions containing basic salts such as sodium hydroxide, magnesium hydroxide, calcium hydroxide, potassium hydroxide, and sodium hydrogen carbonate; and neutral aqueous solutions, such as pure water and aqueous solutions containing neutral salts, such as sodium chloride.

The above mentioned organic solvents may be used alone or in combination of two or more thereof. In addition, the solvent used may be an organic solvent, an inorganic solvent, or a mixture thereof.

Dispersing Aid

The phosphorus-modified metal oxide sol of the present invention may further comprise a dispersing aid. The dispersing aid is not particularly limited, and for example, one or more selected from methyl acetoacetate, acetylacetone, and N,N-dialkyl acetoacetamide can preferably be used. Among these, from the viewpoint of safety etc., particularly preferred are acetylacetone and N,N-dialkyl acetoacetamide.

<Production Method of Phosphorus-Modified Metal Oxide Sol>

The phosphorus-modified metal oxide sol of the present invention can be produced by the reaction of a phosphorus compound and a metal oxide. Regarding the ratio of the metal oxide and the phosphorus compound, relative to 1 mole of metal atoms contained in the metal oxide, the number of moles of phosphorus atoms contained in the phosphorus compound is preferably about 0.01 to about 1.00, more preferably about 0.05 to about 0.70, and particularly preferably about 0.10 to about 0.50. In the cases where a metal oxide sol is used as the metal oxide, the phosphorus compound may be mixed therewith during or after the production of the metal oxide sol.

The reaction of the phosphorus compound and the metal oxide is preferably allowed to proceed with heating. The heating method is not particularly limited, and examples thereof include use of an electric heater, a heat medium, or microwaves. The heating method may be appropriately selected depending on the amount of the metal oxide dispersion, the scale of the production equipment, etc. so that the heating can be performed safely. The use of microwaves tends to result in a cured product having fewer cracks.

The reaction temperature at the time of the production of the metal oxide dispersion is not particularly limited as long as the reaction is allowed to proceed, and is, for example, about 0° C. to about 100° C., preferably about 40° C. to about 80° C. The reaction time is not particularly limited as long as the reaction is allowed to proceed, and is about 1 minute to about 10 hours, preferably about 1 minute to about 5 hours, and more preferably about 2 minutes to about 3 hours.

The metal oxide dispersion used in the present invention itself has polymerization ability. Therefore, in a preferred embodiment of the present invention, no resin binder is used in the production of the thin film. Without any resin binder, the resulting thin film can preferably have a higher refractive index. In addition, since the metal oxide dispersion used in the present invention is in itself photopolymerizable, curing can be performed by light irradiation as described later, and a patterned film can easily be obtained.

<Production Method of Thin Film Having High Refractive Index>

The thin film of the present invention having a high refractive index can be produced by the following steps.

First step: forming a coating of a phosphorus-modified metal oxide sol on a substrate.

Second step: curing the coating obtained in the first step by light irradiation to form a thin film.

Third step: adding energy to the film by heating and/or light irradiation.

<Formation of Coating>

Substrate

The material of the substrate is selected depending on the intended use and is not particularly limited. Examples of usable materials include semiconductors (for example, silicon, gallium, arsenic, gallium nitride, silicon carbide, etc.), metals (for example, aluminum, copper, etc.), ceramics (for example, zirconium oxide, titanium oxide, PZT, etc.), transparent inorganic materials (for example, glass, quartz, magnesium fluoride, calcium fluoride, etc.), transparent resins (for example, polyethylene terephthalate, polymethylmethacrylate, etc.), etc. In the cases of use of a transparent resin among these materials of the substrate, not heating but light irradiation is preferably performed in the third step.

Application Method

In the present invention, a photopolymerization initiator should be mixed into the phosphorus-modified metal oxide sol before or during the application of the sol onto the substrate. Examples of the photopolymerization initiator include benzoins (for example, benzoin, benzoin alkyl ethers, such as benzoin methyl ether, benzoin ethyl ether, benzoin isopropyl ether, and benzoin isobutyl ether, etc.); acetophenones (for example, acetophenone, p-dimethyl acetophenone, 2-hydroxy-2-methyl-1-phenylpropan-1-one, 2,2-diethoxy acetophenone, 2,2-dimethoxy-2-phenyl acetophenone, 2,2-diethoxy-2-phenyl acetophenone, 2-phenyl-2-hydroxy-acetophenone, 1,1-dichloro acetophenone, 1-hydroxy cyclohexyl phenyl ketone, etc.); propiophenones (for example, p-dimethylamino propiophenone, 2-hydroxy-2-methyl-propiophenone, 2,2-dimethoxy-1,2-diphenylethan-1-one, etc.); butyryl phenons (for example, 1-[4-(2-hydroxy-ethoxy)phenyl]-2-hydroxy-2-methyl-1-propan-1-one, 2-hydroxy-2-methyl-1-phenyl-propan-1-one, 1-(4-isopropylphenyl)-2-hydroxy-2-methyl-propan-1-one, etc.); aminoacetophenones (for example, 2-methyl-2-morpholino(4-thiomethylphenyl)propan-1-one, 2-methyl-1-[4-(methylthio)phenyl]-2-morpholinopropan-1-one, 2-benzyl-2-dimethylamino-1-(4-morpholinophenyl)-butan-1-one, 2-dimethylamino-2-methyl-1-phenylpropan-1-one, 2-diethylamino-2-methyl-1-phenylpropan-1-one, 2-methyl-2-morpholino-1-phenylpropan-1-one, 2-dimethylamino-2-methyl-1-(4-methylphenyl)propan-1-one, 1-(4-butylphenyl)-2-dimethylamino-2-methylpropan-1-one, 2-dimethylamino-1-(4-methoxypheny)-2-methylpropan-1-one, 2-dimethylamino-2-methyl-1-(4-methylthiophenyl)propan-1-one, 2-benzyl-2-dimethylamino-1-(4-dimethylaminophenyl)-butan-1-one, etc.); benzophenones (for example, benzophenone, benzil, N,N'-dialkylamino benzophenones, such as N,N'-bis(dimethylamino) benzophenone (Michler's ketone), 3,3-dimethyl-4-methoxybenzophenone, etc.); ketals (for example, acetophenone dimethyl ketal, benzyl dimethyl ketal, etc.); thioxanthenes (for example, thioxanthene, 2-chloro thioxanthene, 2,4-diethyithioxanthene, etc.); anthraquinones (for example, 2-ethylanthraquinone, 1-chloroanthraquinone, 1,2-benzanthraquinone, 2,3-diphenylanthraquinone, etc.); (thio)xanthones (for example, thioxantone, 2,4-dimethylthioxantone, 2,4-diethylthioxanthone, 2-chlorothioxantone, 2,4-diisopropyl thioxantone, etc.); acridines (for example, 1,3-bis-(9-acridinyl) propane, 1,7-bis-(9-acridinyl) heptane, 1,5-bis-(9-acridinyl) pentane, etc.); triazines (for example, 2,4,6-tris(trichloromethyl)-s-triazine, 2-(4-methoxypheny)-4,6-bis(trichloromethyl)-s-triazine, 2,4-bis-trichloromethyl-6-(3-bromo-4-methoxy) styrylphenyl-s-triazine, etc.); sulfides (for example, benzyldiphenyl sulfide, etc.); acyl phosphine oxides (for example, 2,4,6-trimethylbenzoyldiphenyl phosphine oxide, etc.); titanocene photopolymerization initiators; oxime esters; etc. These photopolymerization initiators may be used alone or in combination of two or more thereof.

The application method is not particularly limited, and examples thereof include flow coating, spin coating, spray coating, screen printing, casting, bar coating, curtain coating, roll coating, gravure coating, dipping, slit coating, etc.

Curing of Coating

The coating of the present invention can be cured by light irradiation. Therefore, by using a photomask or the like, an accurately and finely patterned thin film can be produced easily and quickly.

The light for the irradiation is not particularly limited, and examples thereof include gamma rays, X-rays, ultraviolet (UV) rays, visible rays, etc. Preferred are visible rays and ultraviolet (UV) rays. The wavelength of the light to be used is about 150 nm to about 800 nm, preferably about 150 nm to about 600 nm, and more preferably about 150 nm to about 400 nm.

In an embodiment of the present invention, the light used for irradiation in the second step preferably comprises one or more emission lines having a wavelength within the range of about 150 nm to about 400 nm and/or one or more lights having a continuous wavelength spectrum within the range of about 150 nm to about 400 nm.

The accumulated amount of light irradiation (hereinafter also referred to as amount of light irradiation) may be selected depending on the thickness of the coating, etc. The amount of light irradiation is not particularly limited, and is, for example, about 1 to about 10000 mJ/cm$^2$. From the viewpoint of production efficiency etc., preferred is about 5 to about 5000 mJ/cm$^2$, and more preferred is about 10 to about 1000 mJ/cm$^2$. The irradiated time is not particularly limited, and is, for example, about 0.1 second to about 10 minutes. From the viewpoint of production efficiency etc., preferred is about 5 seconds to about 5 minutes, and more preferred is about 10 seconds to about 1 minute.

In the present invention, the light irradiation device used for curing the coating is not particularly limited as long as the light irradiation can be performed under the above-mentioned conditions, and examples thereof include devices equipped with a carbon arc lamp, a fluorescent lamp, a tungsten lamp, a halogen lamp, an ultraviolet laser, a visible light laser, an infrared light laser, an extra high pressure mercury lamp, a high pressure mercury lamp, a low pressure mercury lamp, a metal halide lamp, an excimer lamp, a xenon lamp, a xenon flash lamp (also referred to as a pulsed xenon lamp or a xenon flash lamp), an electrodeless discharge lamp, etc. These lamps may be used alone or in combination of two or more thereof.

Adjustment of Refractive Index of Thin Film

The thin film cured in the second step itself has transparency and a high refractive index, but the refractive index can further be increased by additional treatment, i.e. heating and/or light irradiation in the third step. It is presumable that such heating and/or light irradiation decomposes organic matter, which results in an increased metal oxide content and an increased refractive index. However, the thin film of the present invention is not largely affected by the decomposed organic matter, and therefore, the transparency of the thin film at each stage is less likely to be lost.

Heat Treatment

The heat treatment in the third step will specifically be described.

The refractive index of the thin film cured in the second step can be adjusted to a further increased level without deterioration in transparency by additionally heating the thin film in the third step. The heating temperature is preferably about 50° C. to about 800° C., more preferably about 100° C. to about 700'C, and particularly preferably about 300° C. to about 600° C. The heating time is not particularly limited and is appropriately selected depending on the device and the scale. From the viewpoint of production efficiency, the heating time is preferably about 10 seconds to about 1800 seconds, more preferably about 30 seconds to about 900 seconds, and particularly preferably about 60 seconds to about 600 seconds. By heating in the above ranges, the refractive index of the thin film can be adjusted to a desired level.

Light Irradiation Treatment

The light irradiation treatment in the third step will specifically be described.

The refractive index of the thin film cured in the second step can be adjusted to a further increased level without deterioration in transparency by irradiating the thin film with a light in the third step. The wavelength of the light is preferably 150 to 1000 nm, and more preferably 200 to 800 nm. The light preferably comprises a light within the range of about 150 nm to about 1000 nm, and more preferably comprises a light within the range of about 200 nm to about 800 nm.

In a preferred embodiment of the present invention, the light is a flash comprising a light having a wavelength within the range of about 150 nm to about 400 nm. In this embodiment, the flash is repeatedly delivered. The interval between the repeated irradiation with the flash is preferably 0.1 to 1 second, more preferably 0.1 to 0.5 second, and particularly preferably 0.3 to 0.5 second. The number of times of the irradiation is preferably 1 to 300, more preferably 10 to 200, and particularly preferably 30 to 150. Preferably, the flash further comprises a light having a wavelength within the range of about 400 nm to about 1000 nm. In a particularly preferred embodiment of the present invention, the flash comprises a light having a wavelength within the range of about 200 nm to about 400 nm and a light having a wavelength within the range of about 400 nm to about 800 nm.

In the present invention, for example, "comprises a light having a wavelength within the range of about 150 nm to about 1000 nm" may be any of the following: (I) one or more emission lines having a wavelength within the range of about 150 nm to about 1000 nm are observed, (II) a light having a continuous wavelength spectrum of about 150 nm to about 1000 nm is observed, (III) one or more emission lines having a wavelength within the range of about 150 nm to about 1000 nm, and one or more lights having a continuous wavelength spectrum within a certain range within the range of about 150 nm to about 1000 nm are observed, and (IV) one or more lights having a continuous wavelength spectrum within a certain range within the range of about 150 nm to about 1000 nm are observed.

In an embodiment of the present invention, the light used for irradiation in the third step preferably comprises one or more emission lines having a wavelength within the range of about 150 nm to about 1000 nm and/or one or more lights having a continuous wavelength spectrum within the range of about 150 nm to about 800 nm.

In the present invention, the light irradiation device used for adjusting the refractive index of the thin film is not particularly limited as long as the light irradiation can be performed under the above-mentioned conditions, and examples thereof include devices equipped with a carbon arc lamp, a fluorescent lamp, a tungsten lamp, a halogen lamp, an ultraviolet laser, a visible light laser, an infrared light laser, an extra high pressure mercury lamp, a high pressure mercury lamp, a low pressure mercury lamp, a metal halide lamp, an excimer lamp, a xenon lamp, a xenon flash lamp (also referred to as a pulsed xenon lamp or a xenon flash lamp), an electrodeless discharge lamp, etc. These lamps may be used alone or in combination of two or more thereof.

In the cases where a pulsed xenon lamp is used, the accumulated amount of light irradiation (hereinafter also referred to as amount of irradiation) is, for example, preferably about 100 to about 1000 mJ/cm$^2$, more preferably about 150 to about 500 mJ/cm$^2$, and particularly preferably about 200 to about 400 mJ/cm from the viewpoint of production efficiency, etc. Herein, the amount of irradiation means the product of the illuminance measured with an illuminometer set at a measurement wavelength of 254 nm and the irradiation time.

By light irradiation in the above ranges, the refractive index of the thin film can be increased, and by changing the accumulated amount of light, the refractive index can be adjusted to a desired level. Specifically, a higher accumulated amount of light results in a higher refractive index. The procedure of the third step can be performed following the second step or simultaneously performed with the procedure of the second step. Herein, "simultaneously performed" encompasses that, for example, in the cases where the third step is the step of heating the thin film, light irradiation of the second step and heating of the third step are simultaneously performed.

In a preferred embodiment of the present invention, the refractive index of the thin film having an increased refractive index is usually 1.7 or higher, preferably 1.8 or higher, and more preferably 1.9 or higher.

In the present invention, the refractive index of the thin film can be measured with, for example, a film thickness meter based on reflectance spectrophotometry at 633 nm. The film thickness meter based on reflectance spectrophotometry may be, for example, the one described in the Examples later.

Also, in the present invention, the accumulated amount of light irradiation (amount of irradiation) in the second or the third step can be measured with, for example, a UV meter in the cases where the wavelength is in the UV range. The UV meter may be, for example, the UV Power Puck II made by Heraeus Holding GmbH. In addition, an illuminometer set at a measurement wavelength of 254 nm can also be used. The illuminometer may be the UVPX-G2K (model number) made by Iwasaki Electric Co., Ltd.

In an embodiment of the present invention, the total light transmittance of the thin film is preferably 80% or higher, more preferably 85% or higher, and particularly preferably 88% or higher. The haze value of the thin film is preferably 1.0 or less, more preferably 0.5 or less, and particularly preferably 0.3 or less.

The total light transmittance and the haze value of the thin film can be measured with, for example, a UV-Vis spectrophotometer in accordance with JIS-K7105 and JIS-K7136.

EXAMPLES

Hereinafter, the present invention will be illustrated in more detail by Experimental Examples and Examples, but the present invention is not limited thereto. Various modifications can be made within the technical idea of the present invention by those with ordinary skill in the art.

The substances, reagents, and measuring instruments used are shown below. The substances etc. used were, unless otherwise stated, commercial products or ones synthesized by a known method.

Raw Materials

<Phosphorus Compound>

| Abbreviated name | Substance name | Chemical formula | Note |
|---|---|---|---|
| MR-200 (trade name) | 2-methacryloyloxyethyl acid phosphate (made by Daihachi Chemical Industry Co., Ltd., average molecular weight: 266) | (structural formula shown) | n represents 1 or 2. |

| Abbreviated name | Substance name | Chemical formula | Note |
|---|---|---|---|
| MP-10 (trade name) | Monoisodecyl phosphate (made by Daihachi Chemical Industry Co., Ltd., average molecular weight: 260) | 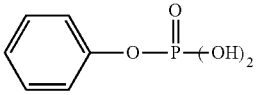 | r represents 0 to 3. |
| Phenyl phosphate | Phenyl phosphate | | |

<Metal Alkoxide>
Titanium tetra-n-butoxide
<Acrylic Monomer>
Pentaerythritol triacrylate (PETA)
<Photopolymerization Initiator>
2-Hydroxy-2-methyl-1-phenylpropan-1-one
(DAROCUR 1173 made by Ciba-Geigy)
<Organic Solvent>
Toluene
Isopropyl alcohol (IPA)
<Alkaline Solution>
2.38 wt % tetramethylammonium hydroxide aqueous solution (NMD-3 made by Tokyo Ohka Kogyo Co., Ltd.)
Measuring Method
Physical Properties of Thin Films The haze value of the thin film was measured with a UV-Vis spectrophotometer (Model V-560 made by JASCO Corp.) in accordance with JIS-K7105 and JIS-K7136.

The refractive index and the thickness of the thin film were measured with a film thickness measurement system based on reflectance spectrophotometry (FE 3000 made by Otsuka Electronics Co., Ltd.). The refractive index was measured at 633 nm, and the film thickness was measured by spectroscopy.

<Preparation of Phosphorus-Modified Metal Oxide Sol 1>

Into a 5 L, 4 neck flask equipped with a stirrer, a thermometer, and a dropping funnel, 250 g (0.74 mol) of titanium tetra-n-butoxide and 2500 g of toluene were placed, and after dissolution, the temperature was raised to 60° C. To this solution, a mixture of 19.6 g (0.074 mol) of MR-200 as a phosphorus compound, 1190 g of IPA, and 39.7 g (2.2 mol) of water was added over 30 minutes. The temperature was maintained for about 30 minutes until the reaction mixture became cloudy, and then lowered to 20'C. The reaction mixture was concentrated under reduced pressure until the solution became clear to give phosphorus-modified metal oxide sol 1.

In this preparation of phosphorus-modified metal oxide sol 1, 0.1 mol of phosphorus atoms contained in the phosphorus compound was used relative to 1 mol of titanium atoms contained in the titanium oxide for the modification thereof.

<Preparation of Phosphorus-Modified Metal Oxide Sol 2>

Into a 5 L, 4 neck flask equipped with a stirrer, a thermometer, and a dropping funnel, 250 g (0.74 mol) of titanium tetra-n-butoxide and 2500 g of toluene were placed, and after dissolution, the temperature was raised to 60'C. To this solution, a mixture of 59.0 g (0.222 mol) of MR-200 as a phosphorus compound, 1190 g of IPA, and 39.7 g (2.2 mol) of water was added over 30 minutes. The temperature was maintained for about 30 minutes until the reaction solution became cloudy, and then lowered to 20° C. The reaction mixture was concentrated under reduced pressure until the solution became clear to give phosphorus-modified metal oxide sol 2.

In this preparation of phosphorus-modified metal oxide sol 2, 0.3 mol of phosphorus atoms contained in the phosphorus compound was used relative to 1 mol of titanium atoms contained in the titanium oxide for the modification thereof.

<Preparation of Phosphorus-Modified Metal Oxide Sol 3>

Into a 5 L, 4 neck flask equipped with a stirrer, a thermometer, and a dropping funnel, 250 g (0.74 mol) of titanium tetra-n-butoxide and 2500 g of toluene were placed, and after dissolution, the temperature was raised to 60° C. To this solution, a mixture of 57.7 g (0.222 mol) of MP-10 as a phosphorus compound, 1190 g of IPA, and 39.7 g (2.2 mol) of water was added over 30 minutes. The temperature was maintained for about 30 minutes until the reaction solution became cloudy, and then lowered to 20° C. The reaction mixture was concentrated under reduced pressure until the solution became clear to give phosphorus-modified metal oxide sol 3.

In this preparation of phosphorus-modified metal oxide sol 3, 0.3 mol of phosphorus atoms contained in the phosphorus compound was used relative to 1 mol of titanium atoms contained in the titanium oxide for the modification thereof.

<Preparation of Phosphorus-Modified Metal Oxide Sol 4>

Into a 5 L, 4 neck flask equipped with a stirrer, a thermometer, and a dropping funnel, 250 g (0.74 mol) of titanium tetra-n-butoxide and 2500 g of toluene were placed, and after dissolution, the temperature was raised to 60° C. To this solution, a mixture of 38.6 g (0.222 mol) of phenyl phosphate as a phosphorus compound, 1190 g of IPA, and 39.7 g (2.2 mol) of water was added over 30 minutes. The temperature was maintained for about 30 minutes until the reaction solution became cloudy, and then lowered to 20° C. The reaction mixture was concentrated under reduced pressure until the solution became clear to give phosphorus-modified metal oxide sol 4.

In this preparation of phosphorus-modified metal oxide sol 4, 0.3 mol of phosphorus atoms contained in the phosphorus compound was used relative to 1 mol of titanium atoms contained in the titanium oxide for the modification thereof.

Example 1

To 650 mg of the phosphorus-modified metal oxide sol 1, 4.7 mg of 2-hydroxy-2-methyl-1-phenylpropan-1-one as a photopolymerization initiator was added. The mixture was stirred and deposited onto a glass substrate (50 mm×50 mm) by spin coating at 500 rpm to give a coating.

The obtained coating was dried, irradiated with a UV irradiation device (UVC-1212/1MNLC3-AA04 made by Ushio Inc.) equipped with a high pressure mercury lamp (UVL-800-O/N made by Ushio Lighting Inc. having dominant wavelength of 365 nm) to receive 414.9 mJ/cm$^2$, and then immersed in a 10-fold water-diluted solution of NMD-3 (an alkaline solution) for 10 seconds. Then, washing with water and drying treatment were performed to give a thin film having a thickness of 285 nm.

The amount of irradiation was measured with a UV meter (UV Power Puck II made by Heraeus Holding GmbH) within the range of UVA. The resulting thin film had a refractive index of 1.805 and a haze value of 0.2.

Example 2

The same procedure as in Example 1 was performed except that the phosphorus-modified metal oxide sol 2 was used instead of the phosphorus-modified metal oxide sol 1, to give a thin film having a thickness of 450 nm. The resulting thin film had a refractive index of 1.710 and a haze value of 0.2.

Example 3

The procedure was performed in the same manner as in Example 1 except that a PET resin substrate was used instead of the glass substrate to give a thin film having a thickness of 285 nm. The resulting thin film had a refractive index of 1.805 and a haze value of 0.2.

Comparative Example 1

The same procedure as in Example 1 was performed except that the phosphorus-modified metal oxide sol 3 was used instead of the phosphorus-modified metal oxide sol 1. In this case, the coating on the substrate was completely removed and film formation was not achieved.

Comparative Example 2

The same procedure as in Example 1 was performed except that the phosphorus-modified metal oxide sol 4 was used instead of the phosphorus-modified metal oxide sol 1. In this case, the coating on the substrate was completely removed and film formation was not achieved.

As shown in Examples 1 to 3, a phosphorus-modified metal oxide sol of the present invention subjected to UV irradiation is cured and forms a thin film, which does not come off the substrate even after immersed in an alkaline solution. That is, with use of a photomask, development of a finely patterned thin film can easily be performed. As shown in Comparative Examples 1 and 2, a phosphorus-modified metal oxide sol not having any photopolymerizable functional group is not cured even when subjected to UV irradiation, and therefore, development of a finely patterned thin film cannot be achieved.

Example 4

The thin film obtained in Example 1 was heated for 5 minutes on a hot plate at a temperature shown in Table 1 below, and the refractive index was measured. The results are shown in Table 1.

TABLE 1

| Temperature (° C.) | 50 | 100 | 150 | 200 | 250 | 300 | 350 | 400 | 500 |
|---|---|---|---|---|---|---|---|---|---|
| Refractive index | 1.816 | 1.862 | 1.886 | 1.921 | 1.930 | 2.000 | 2.018 | 2.046 | 2.089 |

Example 5

The thin film obtained in Example 2 was heated for 5 minutes on a hot plate at a temperature shown in Table 2 below, and the refractive index was measured. The results are shown in Table 2.

TABLE 2

| Temperature (° C.) | 50 | 100 | 150 | 200 | 250 | 300 | 350 | 400 | 500 | 600 |
|---|---|---|---|---|---|---|---|---|---|---|
| Refractive index | 1.714 | 1.744 | 1.763 | 1.777 | 1.801 | 1.918 | 1.962 | 1.973 | 1.971 | 2.030 |

Example 6

The thin film obtained in Example 3 was irradiated with a pulsed xenon lamp (PXL2000L-2ES2 made by Iwasaki Electric Co., Ltd.) emitting a light of a continuous spectrum from 200 nm having its peak at 370 nm to receive the amount of irradiation shown in Table 3 below, and the refractive index was measured. The results are shown in Table 3.

The illuminance was measured with an illuminometer (UVPX-G2K made by Iwasaki Electric Co., Ltd.) at a wavelength of 254 nm, and the amount of irradiation was calculated as the product of the illuminance and the irradiation time (the number of seconds).

TABLE 3

| Irradiated amount (mJ/cm$^2$) | 70 | 173 | 200 | 225 | 255 | 324 |
|---|---|---|---|---|---|---|
| Refractive index | 1.805 | 1.812 | 1.824 | 1.850 | 1.892 | 1.952 |

Examples 4 and 5 show that the refractive index of the thin film can be adjusted by heating, and Example 6 shows that the refractive index of the thin film can be adjusted by light irradiation and that a PET resin substrate is less susceptible to heat damage.

INDUSTRIAL APPLICABILITY

The production method of the present invention facilitates fine patterning of a thin film having a high refractive index, and is useful for the formation of semiconductor devices, such as a flat-panel display, a photo sensor, an integrated optical circuit, and a light emitting diode and for the production of optical materials, such as an index matching for touch screens and a high refractive layer of an antireflection film.

The invention claimed is:

1. A method for producing a thin film without using any resin binder, comprising:

a first step of forming, on a substrate, a coating using a sol comprising a metal oxide, wherein the metal of the metal oxide is at least one metal selected from the group consisting of titanium, zirconium, hafnium, aluminum, zinc, and tin, modified with a phosphorus compound of the following formula (1):

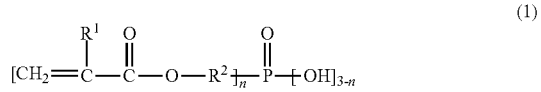
(1)

wherein: $R^1$ is a hydrogen atom or a linear or branched alkyl group having 1 to 5 carbon atoms;

$R^2$ is a divalent organic residue of the following formula (2):

(2)

wherein Y is a linear or branched alkylene group having 1 to 10 carbon atoms; and p is an integer of 1 to 10; and n is 1 or 2, a second step of curing the coating formed on the substrate obtained in the first step by light irradiation to obtain a cured film, and a third step of further adding energy to the cured film obtained in the second step by heating and/or light irradiation.

2. The method according to claim 1, wherein Y in the formula (2) is a linear or branched alkylene group having 1 to 4 carbon atoms.

3. The method according to claim 1, wherein the metal of the metal oxide is at least one metal selected from the group consisting of titanium and zirconium.

4. The method according to claim 1, wherein the light used in the second step is a light comprising a wavelength of 150 to 400 nm.

5. The method according to claim 1, wherein the heating temperature in the third step is 50 to 800° C.

6. The method according to claim 1, wherein the wavelength of the light used in the third step is 150 to 1000 nm and the accumulated amount of light irradiation is 100 to 2000 mJ/cm$^2$.

* * * * *